US005454074A

United States Patent [19]
Hartel et al.

[11] Patent Number: 5,454,074
[45] Date of Patent: Sep. 26, 1995

[54] ELECTRONIC CHECKLIST SYSTEM

[75] Inventors: Martin C. Hartel; Shu (Billy) C. Chou, both of Renton, Wash.

[73] Assignee: The Boeing Company, Seattle, Wash.

[21] Appl. No.: 245,234

[22] Filed: May 17, 1994

Related U.S. Application Data

[63] Continuation of Ser. No. 762,309, Sep. 18, 1991, abandoned.
[51] Int. Cl.$^6$ .................................................. G06F 17/21
[52] U.S. Cl. ...................... 395/161; 395/144; 364/424.06; 434/50
[58] Field of Search ........................... 395/144, 155–156, 395/157, 161; 364/401, 424.04, 424.06, 423, 550, 550.01; 434/29, 30, 50, 49; 244/194–196

[56] References Cited

U.S. PATENT DOCUMENTS

| | | | |
|---|---|---|---|
| 3,713,090 | 1/1973 | Dickinson | 340/27 R |
| 4,635,030 | 1/1987 | Rauch | 340/52 F |
| 4,869,531 | 9/1989 | Rees | 283/67 |
| 4,962,473 | 10/1990 | Crain | 364/900 |
| 4,970,683 | 11/1990 | Harshaw | 364/900 |
| 5,019,980 | 5/1991 | Starr et al. | 364/424.04 |
| 5,122,972 | 6/1992 | Richards et al. | 395/157 |
| 5,267,147 | 11/1993 | Harshaw et al. | 364/401 |

Primary Examiner—Heather R. Herndon
Assistant Examiner—J. Feild
Attorney, Agent, or Firm—Christensen, O'Connor, Johnson & Kindness

[57] ABSTRACT

Disclosed is a computer-based electronic checklist system (10) that is interfaced with a crew alert system (12). The system provides both normal checklists (i.e., checklists for use during routine operation of the airplane) and non-normal checklists for use with crew alert messages that are supplied by the crew alert system. Non-normal checklists that are not associated crew alert messages are also provided. Status indicators are provided to indicate the completion state of non-normal checklists; the completion state of normal checklists, and, when applicable, the existence of a normal checklist that has not yet been used during that particular flight program. Checklist line items of each checklist are displayed in a manner that distinguishes between closed-loop items (i.e., checklist items for which the system operator need not respond); and open-loop line items (i.e., items requiring an operator response). Visual indication also is provided as to the completion state of each open-loop and closed-loop checklist line item. Accessing a desired normal or non-normal checklist is accomplished by using one of two command buttons (48 and 53). Operational notes encountered during operation of the system can be displayed at any time by actuating a single command button (52) and a system menu screen listing the normal and non-normal checklists is displayed by actuating a single command button (50).

14 Claims, 9 Drawing Sheets

ELECTRONIC CHECKLIST SYSTEM

This application is a continuation application based on prior application Ser. No. 07/762,309, filed on Sep. 18, 1991, now abandoned.

FIELD OF THE INVENTION

This invention relates to methods and apparatus for providing checklist procedures useful in the safe and efficient operation of relatively complex apparatus and equipment. More specifically, this invention relates to computer-based systems and computer-based methods for displaying and executing checklist procedures in the operation of airplanes and other equipment and systems that generally employ a plurality of checklists applicable to normal operating conditions and, in addition, employ a plurality of checklists applicable to non-normal operating conditions.

BACKGROUND OF THE INVENTION

There are many situations in which checklists are used in an attempt to ensure safe and reliable operation of various types of equipment and systems. Some situations such as the operation of airplanes and other complex equipment and systems require several "normal" checklists that are used during different operational phases encountered when the airplane or other equipment is operating under normal conditions. Usually, these situations also employ several "non-normal" checklists that are used when various non-normal operating conditions are encountered.

The most prevalent type of checklists used today are printed paper checklists, which list checklist line items (checklist steps) on a series of cards or the pages of a book. Although simple in form, paper checklists are subject to several disadvantages and drawbacks. For example, if checklist items are skipped for later performance they may be forgotten. In addition, paper checklists do not provide an indication of checklist execution progress (i.e., the line items completed or not completed). Thus, completion of checklist line items may be forgotten if execution of the checklist is interrupted for any reason.

There have been various attempts to provide improved checklist systems, including devices for scrolling a paper checklist so that one checklist line item at a time is visible through a window or other opening. Electromechanical checklist systems have been provided, which generally include a plurality of switches that correspond to various line items. In such systems, the switches are actuated to indicate completion of the corresponding line item. Checklist systems that audibly read out line items of a selected checklist also have been developed. In such systems, the pilot or other crew member typically activate a check-off switch to proceed to the next checklist item. Electronic checklist system also have been provided, with such systems usually displaying checklist items on a cathode ray tube such as the airplane weather radar display. The checklist provided by these prior art electronic systems generally correspond to paper checklists that simply have been convened to electronic format.

Although the prior art has provided some advances over conventional paper checklists, a checklist system that provides reliable and rapid access, display and execution of both normal and non-normal checklists has not been developed or proposed. Further, the prior art has not provided a checklist system that easily accommodates switching between normal and non-normal checklists without risk of falling to complete all line items of each accessed checklist. Nor has a system been developed that lends itself to easily maintaining and modifying the system checklists.

SUMMARY OF THE INVENTION

The invention provides a computer-based electronic checklist system (and related methods) for the rapid and accurate presentation of both normal and non-normal checklists upon request by the flight crew. The normal checklists that are provided in accordance with the invention are arranged in a sequence that corresponds to the order in which the normal checklists are used during normal operation of the airplane. A plurality of non-normal checklists are provided by the invention, including checklists applicable to and associated with crew alert messages that are supplied by an airplane crew alert system. Also provided are non-normal checklists that are applicable to situations for which the airplane crew alert system does not provide a crew alert message.

Both open-loop checklist line items (which must be "checked-off" by the crew member operating the system) and closed-loop checklist line items (which are completed without action of the crew member) can be employed in the normal and non-normal checklists provided by the invention. In the preferred embodiments of the invention, open-loop checklist items are checked-off by means of a cursor that is generated on the face of the system display device, with the cursor being positioned and actuated by means of a checklist system interface unit. Signals required to verify completion of closed-loop checklist line items are provided to the electronic checklist system from the airplane overhead switch panel and other sources via the airplane data buses. Completion of both open-loop and closed-loop checklist items is indicated in the currently preferred embodiments of the invention by changing the color of the displayed text of the checklist item from white to green.

The invention also generates indicia that allows rapid visual determination of the checklist system operating state. For example, if a normal checklist is accessed and displayed for execution and the checklist system is then operated in a different mode (e.g., execution of a normal checklist is interrupted to access, display and execute a non-normal checklist), an electronically generated button that is displayed on the face of the system display unit for use in accessing normal checklists is displayed with an amber background. The system also provides visible indicia of the status of each non-normal checklist that is associated with the crew alert messages that have been generated by the crew alert system. In the currently preferred embodiments of the invention, this status indicia is provided by a small square or other symbol that is displayed in conjunction with the corresponding crew alert message. The square or other symbol is displayed in white if the related non-normal checklist has not been accessed; is displayed in green if the associated non-normal checklist has been accessed and fully executed; and is displayed in amber if the associated non-normal checklist has been accessed for execution but has not been fully executed. When multi-page normal or non-normal checklists are displayed in the currently preferred embodiments of the invention, a page indicator is displayed in which the color of the page numbers are displayed in white, green or amber to respectively indicate that the page has not been accessed for execution; has been accessed and fully executed; or has been accessed but has not been fully executed. In addition, in the currently preferred embodiments of the invention a page number is displayed in blue if the associated page displays only operational notes or other textual information. When operational notes are displayed the text is blue in color to distinguish it from both complete and incomplete checklist line items.

Preferably, the operational notes that are included in non-normal checklists that are associated with those crew alert messages that are generated by the crew alert system are stored in system memory. Whenever operational notes are stored in memory, the electronic checklist system generates and displays a command button that can be actuated so that the system displays the entire collection of operational notes. In addition, the preferred embodiments of the invention also dynamically accumulate landing preparation steps that are included in non-normal checklists corresponding to the crew alert messages that are generated by the crew alert system. The landing preparation steps are stored in system memory and are displayed as a part of the normal checklist that is generated by the system for use when the airplane is preparing for and executing a landing approach.

The currently preferred embodiments of the invention also include provision for loading data that is used by the electronic checklist system. Preferably, the data that is loaded into the system is generated by a database management system that is installed in a PC-type computer. This provision allows rapid and readily implemented maintenance, updating and modification of the normal and non-normal checklists that are generated, displayed and executed in accordance with the invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
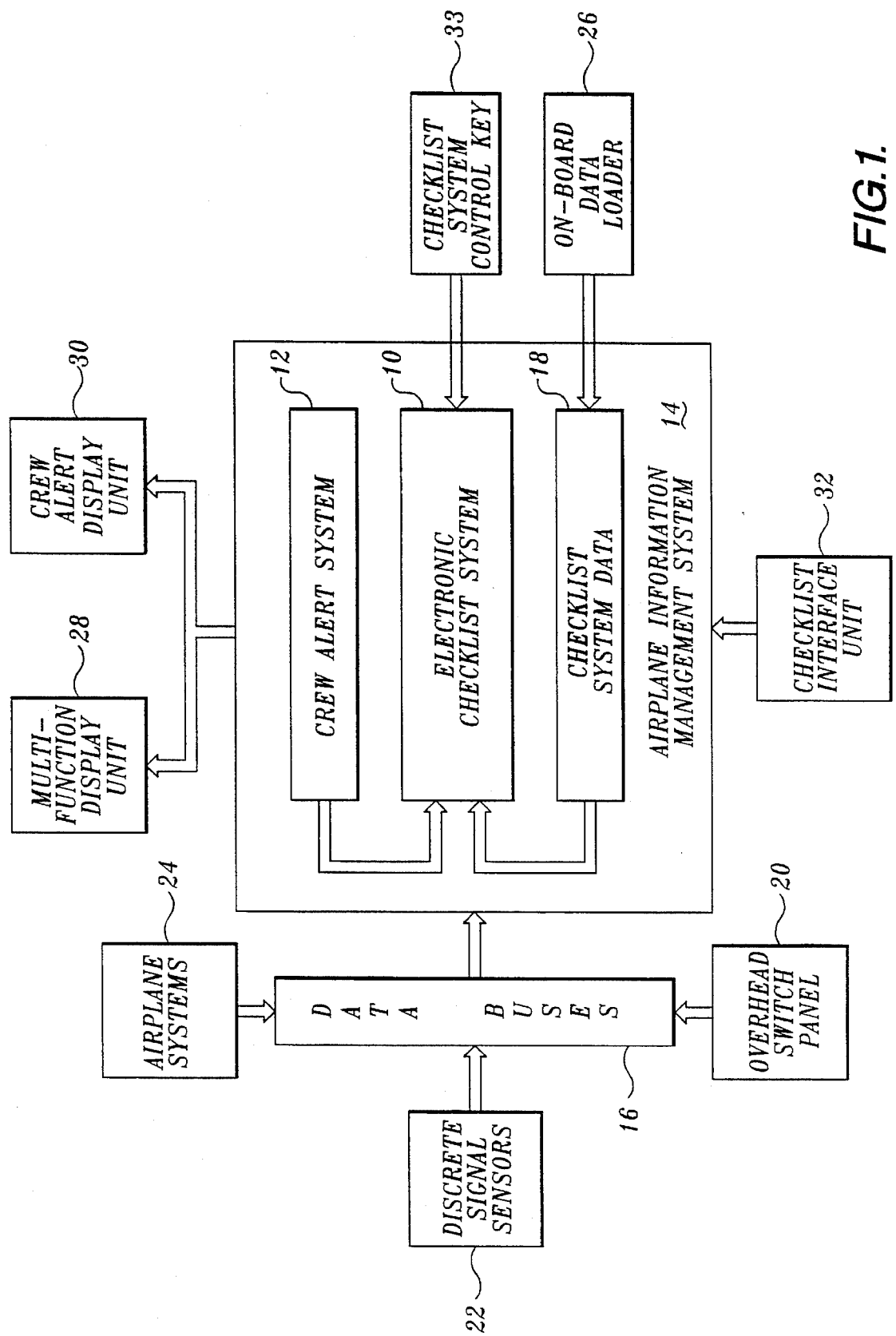
FIG. 1 is a block diagram depicting an electronic checklist system of this invention operatively interconnected with an airplane crew alert system, display units and various other airplane systems and equipment that are used in the practice of the invention.

As previously mentioned, the invention is a computer-based electronic checklist system that operates in conjunction with a crew alert system to provide interactive rapid retrieval and execution of checklists that are used during normal operation of an airplane and, in addition, checklists that are used during non-normal operating conditions. In the currently preferred embodiments of the invention, the signal processing means of both the crew alert system and the electronic checklist system are realized as a single digital signal processing unit. In these currently preferred embodiments, which are shown in block diagram form in FIG. 1, the electronic checklist system (generally identified by reference numeral 10) and a crew alert system 12 are included in an airplane information management system 14. Airplane information management system 14 includes one or more signal processing units and related memory (both random access memory and read only memory) that are structurally and functionally interconnected in a conventional manner. Stored in memory are programs for processing data that is supplied to airplane information management system 15 via the airplane data buses 16. Data used during operation of airplane information management system 14 also are stored in system memory. For example, expressly indicated in FIG. 1 is the checklist system data 18.

In the type of airplane in which the electronic checklist system of this invention will initially be installed, data buses 16 include data buses that structurally and functionally meet the requirements of ARINC 629. Use of the ARINC 629 technology allows airplane information management system 14 to access signals representative of the state (e.g., opened, closed, on, off) of various airplane switches and valves such as the switches located on the flight deck overhead switch panel (20 in FIG. 1). These switches are of significance in the practice of the invention since some checklists call for verification that one or more switches located on overhead switch panel 20 have been placed in an on or an off state by the pilot or another member of the flight crew. As shall be described in more detail, in the currently preferred embodiments of the invention, electronic checklist system 10 monitors the state of various switches that are located on overhead switch panel 20. During execution of a checklist in which one or more checklist items (i.e., checklist steps) require that a switch located on overhead switch panel 20 be in a certain state, electronic checklist system 10 automatically notes completion of that step as soon as the associated switch is placed in the proper state. That is, the pilot or other crew member executing the checklist need take no action if the switch that is to be observed or monitored already is in the proper state. If the switch is not in the proper state, electronic checklist system 10 notes completion of the checklist item as soon as the switch is activated by the pilot or crew member (no manual operation is required to confirm completion of the checklist item).

As is known to those skilled in the art, signals representative of the state or condition of devices such as switches and valves (commonly called "discretes") are often employed in airplane systems. Thus, by using discrete signal sensors (indicated by numeral 22 in FIG. 1), the invention can be embodied in airplanes that are not equipped with ARINC 629 data buses. Further, if necessary or desired, discrete signal sensors 22 can be employed in airplanes equipped with ARINC 629 data buses to thereby provide additional information to airplane information management system 14 (and hence provide additional information to electronic checklist system 10).

As also is known to those skilled in the art, the airplane data buses 16 receive various signals from numerous airplane systems (indicated in FIG. 1 by reference numeral 24). For example, various airplane system signals that are supplied to the airplane data buses are monitored and processed by a crew alert system (e.g., crew alert system 12 of FIG. 1) in order to determine non-normal system conditions and report those conditions to the flight crew by means of visual or recorded messages.

With continued reference to FIG. 1, in the currently preferred embodiments of the invention, electronic checklist system 10 is interfaced with crew alert system 12 to receive signals representative of the status of each alert provided by the crew alert system (i.e., whether a particular alert is or is not in effect). In addition, electronic checklist system 10 is interfaced with crew alert system 12 so that electronic checklist system 10 can supply signals to crew alert system 12 indicative of checklist status (i.e., whether a checklist associated with a crew alert has been completed; has been accessed for execution, but has not been completed; or, has not yet been accessed for execution). The interfacing and interrelationship is diagrammatically depicted in FIG. 1 and shall be described in more detail.

As also is diagrammatically indicated in FIG. 1, electronic checklist system 10 receives data signals from checklist system data 18. These data signals provide electronic checklist system 10 with information that includes system configuration information (e.g., checklist system version or revision dates and the identity of the airplane in which the system is installed); a checklist index file, which allows rapid retrieval and display of checklists; checklist text which provides the information items displayed by the electronic checklist system; and checklist attribute information, As shall be described in more detail, the checklist attributes and checklist item attributes employed by the invention enable the electronic checklist system to achieve various system objectives. As previously noted, these objectives include accurate and rapid access to and execution of both normal and non-normal checklists; ease of use; a high degree of reliability (both with respect to system operation and ensuring complete execution of all applicable checklists); and the ability to easily maintain and modify the electronic checklist system to suit the needs of a particular airline or other airplane user. Also included in the objectives of the invention are the hereinafter described compile operation notes and landing preparation steps for presentation of operational notes at any desired time and display of landing preparation steps with the Approach Checklist.

FIG. 1 indicates one way of providing ease of checklist system maintenance and modification. In particular, the arrangement of FIG. 1 includes an on-board data loader 26, which is coupled to airplane information management system 14. As is indicated in FIG. 1, on-board data loader 26 supplies data to checklist system data 18 (i.e., memory locations within airplane information management system 14). The data supplied by on-board data loader 16 can modify the checklists that are established by electronic checklist system 10 so as to add checklist line items, delete checklist line items, and change or add notes and offer informational items. In addition, new checklists can be created and the hereinafter described checklist attributes and/or checklist line item attributes can be modified.

As will be recognized by those skilled in the art, various devices can be used to realize on-board dam loader 26. For example, on-board data loader 26 can be a conventional unit for reading magnetically encoded disks or tapes. Regardless of the type of on-board data loader 26 employed, the data supplied to checklist system data 18 is formatted as replacement files. Preferably, the files are established with a PC-type computer or similar device, with the computer being used as a database management tool that employs a graphical user interface. Included in the graphical interface are screens for entry of both checklist and checklist item attributes and textual material.

In the practice of the invention, the crew alert messages supplied by crew alert system 12 and the checklists provided by electronic checklist system 10 are displayed by means of one or more display units such as the multi-function display units currently employed in various types of commercial airplanes. As is indicated in FIG. 1, the currently preferred embodiments of the invention include two display units identified as crew alert system display unit 30 and multi-function display unit 28. In this arrangement, both crew alert system display unit 30 and multi-function display unit 28 are configured and arranged in a manner that is similar to the color monitors that are used in conventional computer and work station systems. Small display units of this type are known in the art and, for example, are employed in the Engine Indication and Crew Alert System that is installed in Boeing Model B757, B767, and B747-400 airplanes. As previously mentioned, the invention currently is embodied with the electronic checklist system 10 and crew alert system 12 being realized in the same digital signal processor (airplane information management system 14). The crew alert system of these embodiments includes the same signal processing and display provisions as the referenced Engine Indication and Crew Alert System. Alternatively, the electronic checklist system of this invention can operate in conjunction with various other types of crew alert systems, either being realized within a common digital signal processor (e.g., airplane information management system 14 of FIG. 1) or being separately realized in different digital data processors.

As also is shown in FIG. 1, the invention includes a checklist interface unit 32, which allows the flight crew to access and execute both normal and non-normal checklists. In the currently preferred embodiments of the invention, checklist interface unit 32 includes a pointing device such as a ball, joystick, or up/down-left/right control keys (not shown in FIG. 1). The pointing device serves as a cursor control for a cursor or other indicia that is generated by electronic checklist system 10. In the currently preferred embodiments, the cursor can be moved over the face of multi-function display unit 28, which is used for displaying normal and non-normal checklists as well as checklist selection menus and other checklist information. As shall be described, the checklists provided by the invention preferably include checklist line items, various command buttons, and page control buttons that are activated by moving the cursor to the vicinity of the item to be activated and depressing a switch or similar device that is included in checklist interface unit 32.

Figure 3A:
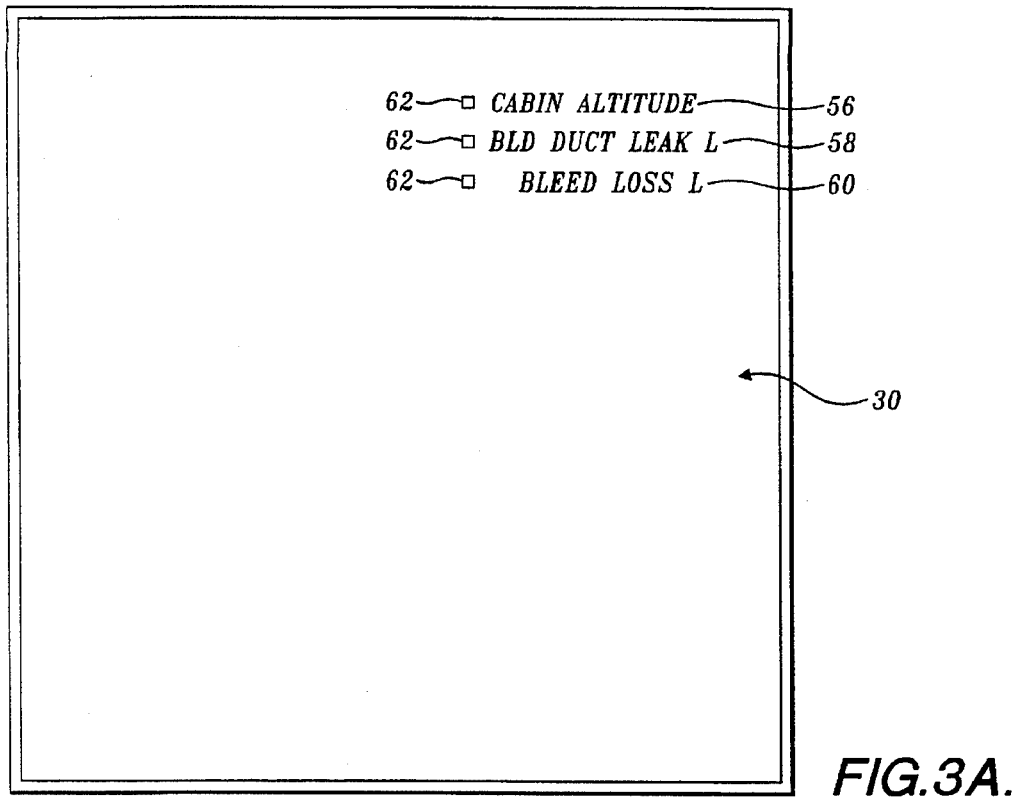
FIGS. 3A and 3B respectively depict exemplary displays generated by the airplane crew alert system and the electronic checklist system when the airplane is operating under non-normal conditions.
Figure 3B:
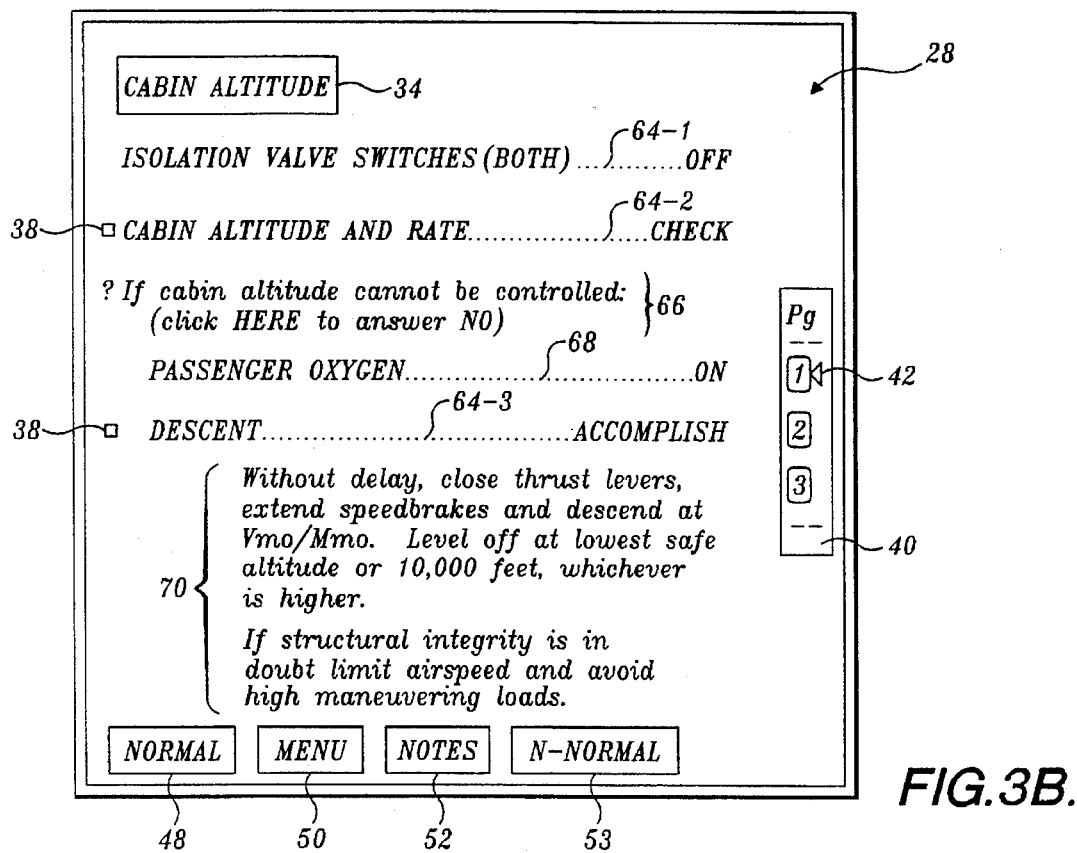
Figure 4:
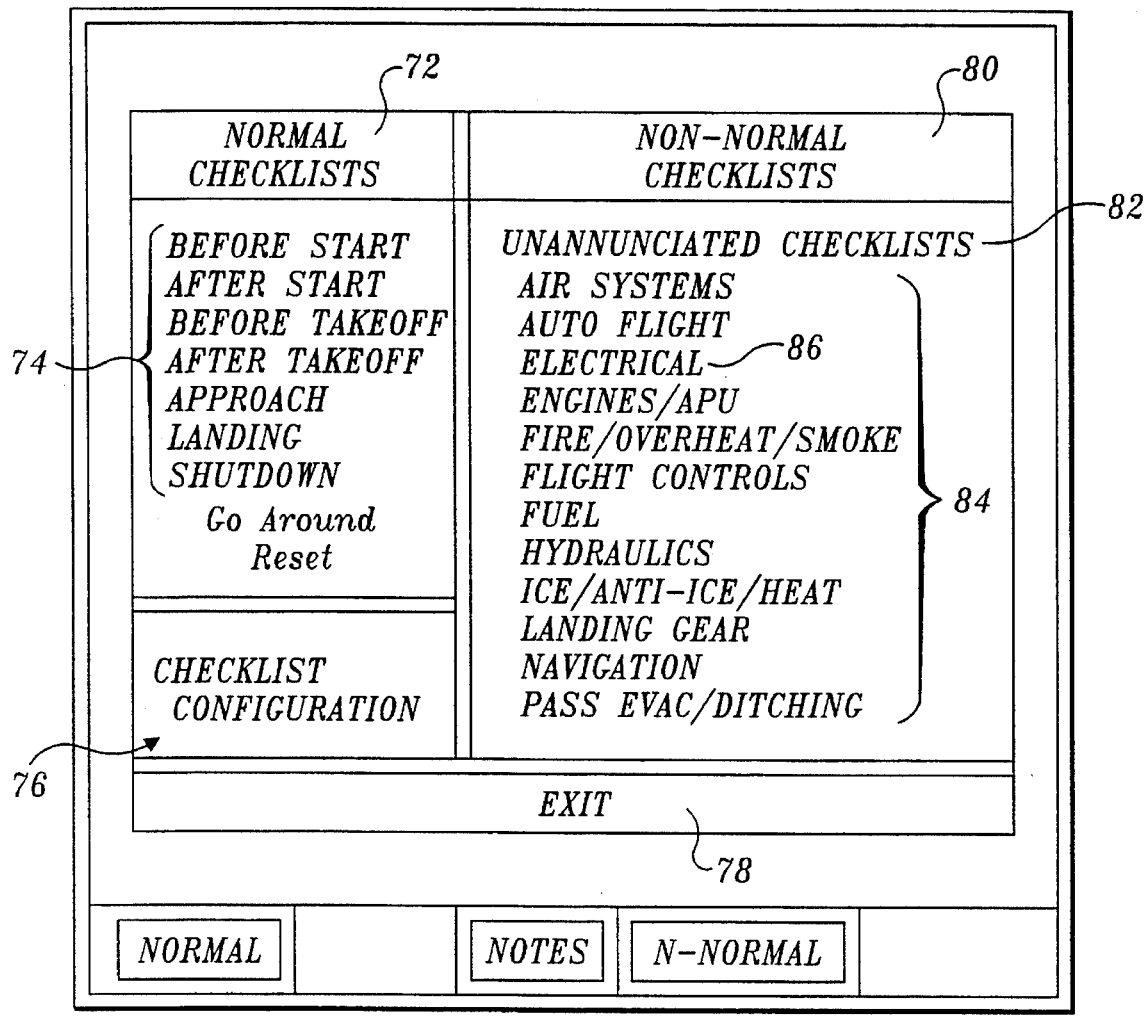
FIG. 4 depicts a menu of the type generated by the electronic checklist system to allow selection of various normal and non-normal checklists.
Figure 5:
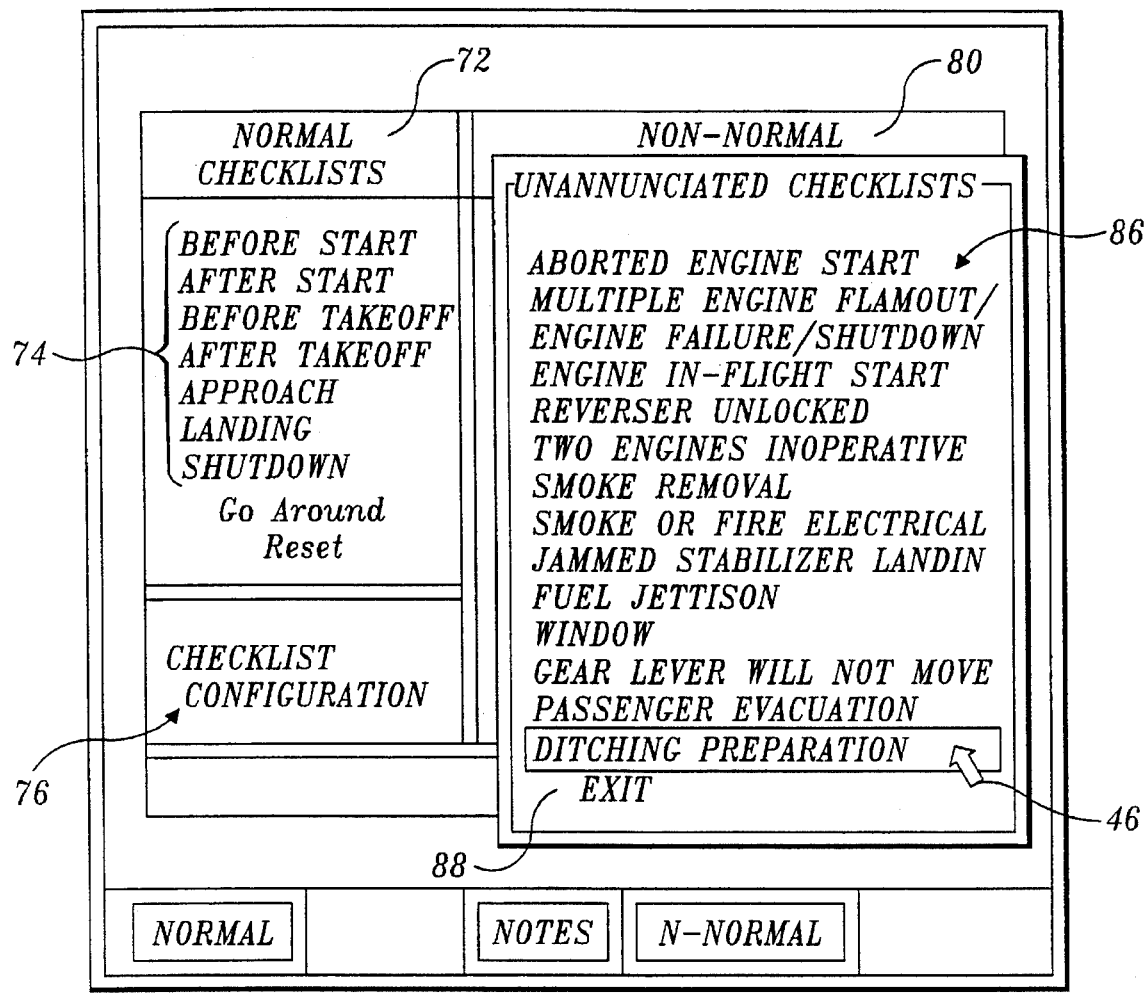
FIG. 5 depicts a menu generated by the electronic checklist system, when the electronic checklist system is operated to display a submenu listing checklists included in a specific category of non-normal checklists.

Various other features and advantages of the invention can be understood by considering an exemplary normal checklist (FIG. 2); an exemplary non-normal checklist (FIG. 3); and the menu arrangement used with the currently preferred embodiments of the invention (FIGS. 4 and 5).

Figure 2:
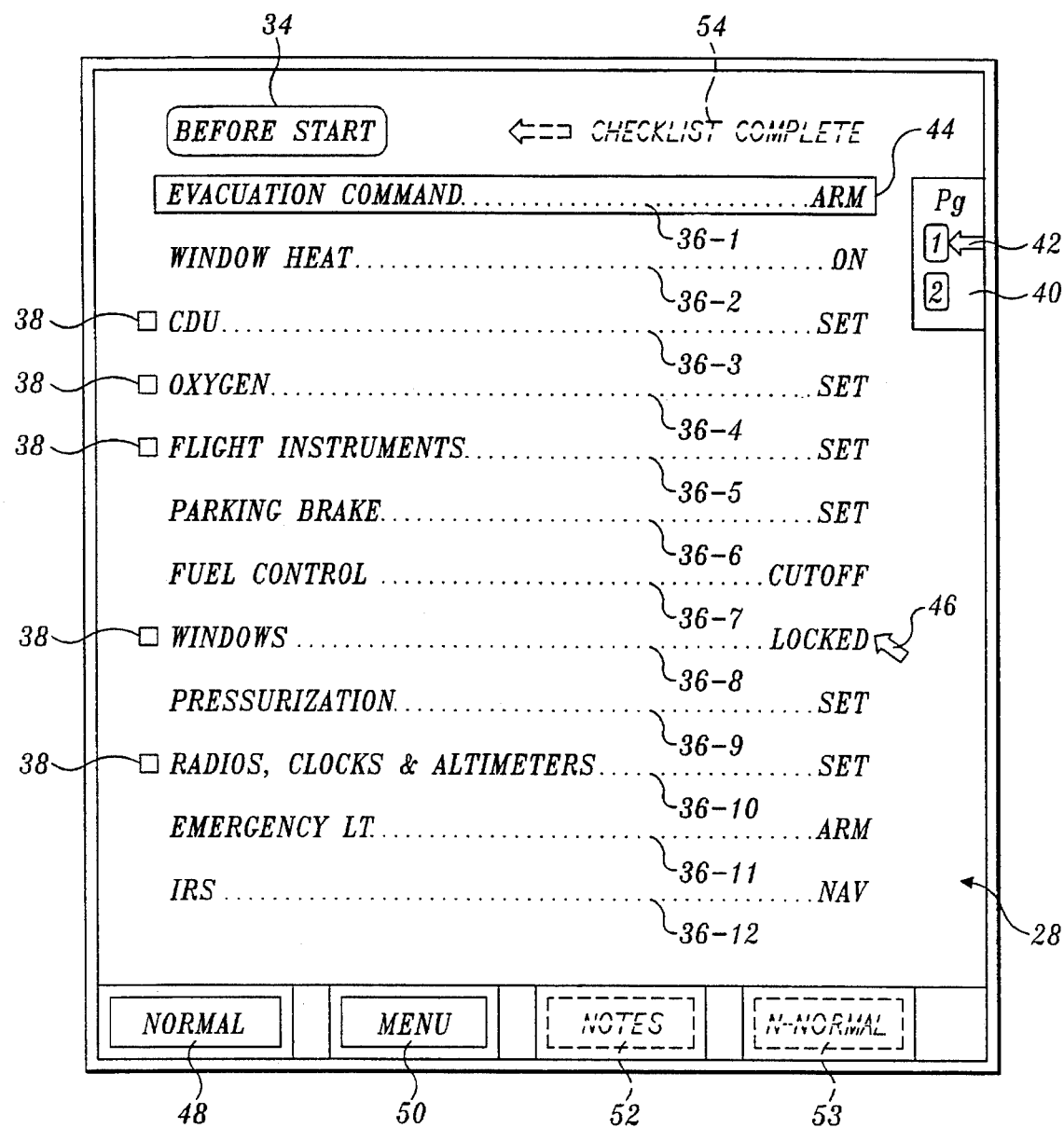
FIG. 2 depicts an exemplary normal checklist (i.e., a checklist of the type generated and displayed by the invention during normal operation of an airplane)

Shown in FIG. 2 is an exemplary "Before Start" checklist which is generated by electronic checklist system 10 in FIG. 1 and displayed on the screen of multi-function display unit 28 for execution by the pilot or other member of the flight crew when preparing to start the aircraft engines. As can be seen in FIG. 2, the checklist display includes a checklist title block 34, which in this case displays the title or legend "Before Start". Displayed below title block 34 is a series of checklist line items 36-1, 36-2, 36-3 . . . , 36-12. Listed on the left-hand side of each line item is an airplane system, instrument or other item of equipment. For example, line item 36-11 includes the listing "EMERGENCY LT," which refers to the airplane emergency lighting system and line item 36-12 lists "IRS," which refers to the airplane inertial reference system. At the right-hand margin of each line item is the condition or status that must be achieved to complete the line item. For example, in the depicted checklist, emergency lighting system is to be armed in order to complete checklist line item 36-11 and the airplane inertial reference system is to be placed in the navigation (NAV) position in order to complete checklist line item 36-12.

In the practice of the invention, there are two types of checklist line items: "open-loop" line items, which require the flight crew to manually check-off the line item to confirm that the required action has been taken or that the required condition has been achieved; and, "closed-loop" line items in which the electronic checklist system 10 senses that the required condition has been achieved and automatically confirms completion of the checklist item. In the currently preferred embodiments of the invention, open-loop checklist line items (those in which the crew member executing the checklist must manually confirm line item completion) are identified by a small square 38 that is located immediately to the left of the line item (or by other visibly discernable indicia). Closed-loop line items, which require no confirmation of completion (e.g., line items items 36-1 and 36-2) are thus identified by the lack of a symbol (square 38).

Many checklists include more line items than can be simultaneously displayed on a display unit such as multi-function display unit 28 of FIG. 1. In the currently preferred embodiments of the invention, checklists that cannot be provided as a single display are arranged as a series of pages. When such a checklist is displayed, the system display includes a paging indicator (40 in FIG. 2). As can be seen in FIG. 2, paging indicator 40 includes a vertical sequence of numerals that indicate each page of the checklist. Located to the right of the page being displayed is an arrow 42.

When a checklist is presented for execution, the crew member that is operating the system utilizes checklist interface unit 32 to control the checklist procedure and, with respect to open-loop checklist items, to confirm that the required condition or status has been achieved. By way of example, in the Before Start checklist of FIG. 2, execution of the checklist has just begun. In this regard, as is indicated by the rectangle 44 that surrounds checklist item 36-1, line item 36-1 is the first line item of the checklist that has not yet been completed. As will be recognized by those skilled in the art, various techniques such as highlighting or reverse video display can be used in indicating a displayed item such as line item 36-1 (i.e., can be used to fulfill the function of rectangle 44 in FIG. 2.

As previously noted, line items that are not identified by a box 38 are closed-loop checklist items. Thus, completion of line item 36-1 need not be verified by the crew member executing the checklist procedure. That is, a signal that indicates the armed/unarmed status of the Evacuation Command System is supplied to electronic checklist system 10 via data buses 16. This signal is monitored by electronic checklist system 10 whenever the Before Start Checklist is displayed for execution, and the checklist display will be altered to indicate completion of the checklist as soon as the system is armed by a crew member. In this regard, in the currently preferred embodiments of the invention, checklist line items (both open-loop and closed-loop) that have not been completed are displayed in white print. When the checklist line item has been completed, the line item is displayed in green. Moreover, in the currently preferred embodiments, closed-loop line items primarily are completed upon actuation of a switch or other devices that initiate the desired action (e.g., arming of the Evacuation Command System) rather than by monitoring a signal that indicates achievement of desired action.

As noted with respect to closed-loop checklist line item 36-1, signals supplied via data bus 16 are continuously monitored to detect completion of closed-loop checklist line items of the particular checklist being displayed. Because of this monitoring process, some or all closed-loop line items may be completed without requiring additional confirmation action by a crew member. For example, if the parking brake is set and the airplane window heat system is on when the Before Start Checklist procedure of FIG. 2 is initially displayed for execution, line items 36-2 and 36-6 will already have been completed and, thus, will be displayed in green print.

In the practice of the invention, the crew member executing a checklist need not perform the checklist in accordance with the displayed sequence. In this regard, an incomplete closed-loop line item can be completed at any time by performing the task required for completion (e.g., activating a switch or setting a selector). To complete an open-loop checklist line item, the crew member selects the line item by using the pointing device of checklist interface unit 32 to position a cursor 46 in FIG. 2 so that the cursor is over any portion of the checklist line item being completed. When the cursor 46 is positioned to select a line item, the switch associated with the cursor is activated to confirm completion. The electronic checklist 10 notes completion of the line item and causes the line item to be displayed in green.

To provide maximum system flexibility, the cursor 46 also can be used to change the status of a completed line item to "not complete." That is, when cursor 46 is positioned over a portion of a previously completed open-loop line item and the associated switch is activated, electronic checklist system 10 sets the status of the line item back to not complete and causes the display of the line item to revert to white.

Cursor 46 and the pointing device checklist interface unit 32 also can be used to cause a different page of the checklist to be displayed even though the checklist line items of the currently displayed checklist have not all been complete. Specifically, with reference to FIG. 2, if the crew member executing the Before Start Checklist wishes to proceed to page 2 of the checklist prior to completing all checklist items of page 1, he or she uses checklist interface unit 32 to position cursor 46 over the desired page indicator of paging indicator 40 (e.g., page 2 of the depicted Before Start Checklist). When the switch associated with cursor 46 is activated, page 2 of the Before Start Checklist will be displayed (not shown in the Figures).

In the currently preferred embodiments of the invention it normally is not necessary for the crew member to use cursor 46 to advance the checklist display to the next page after completing all checklist line items of a page. For example, with respect to the Before Start Checklist of FIG. 2, the final open-loop checklist line item requires confirmation that the airplane radios, clocks and altimeters are set (checklist line item 36-10). If all preceding checklist line items (line items 36-1 through 36-9) are complete when cursor 46 is used to confirm completion of line item 36-10 and, in addition, closed-loop line items 36-11 and 36-12 are complete, electronic checklist system 10 will cause page 2 of the Before Start Checklist to be displayed on multi-function display unit 28 of FIG. 1 without requiring any action on the part of the crew member executing the checklist. However, this automatic page transfer feature of the preferred embodiments is inhibited by electronic checklist system 10 when the final item of a page is an Operational Note (which is presented for reading by a crew member) or is a conditional line item that is completed only if a specified condition exists.

Displayed along the lower boundary of the checklist shown in FIG. 2 are four switch or button regions (which are referred to herein as "command buttons"). More specifically, the depicted checklist includes a NORMAL button 48, a MENU button 50, a NOTES button 52 and a N-NORMAL (i.e., "NON-NORMAL) button 53. Each of these command buttons is selected and activated by cursor 46 in the previously described manner. That is, to activate a particular command button, cursor 46 is positioned over the selected button and the switch associated with the pointing device of checklist interface unit 32 is activated. As shall be described in more detail, the primary function of NORMAL button 48 is to cause electronic checklist system 10 to display the first unaccessed incomplete normal checklist in the sequence of checklists that is provided by the electronic checklist system. That is, in the currently preferred embodiments of the invention, the normal checklists are arranged in a sequence that corresponds to the sequence in which they are performed under normal conditions, starting with the Before Start Checklist and ending with the Shutdown Checklist. Arranging electronic checklist system 10 so that the system displays the first incomplete normal checklist when the normal button 48 is activated enhances both ease of operation and system reliability. For example, if execution of a normal checklist has been interrupted in order to execute a non-normal checklist (or for any other reason), a return to the interrupted, incomplete normal checklist requires only that NORMAL button 48 be activated. To further enhance performance and ease of use, the currently preferred embodiments of the invention provide the crew with a reminder that a normal checklist procedure has not been completed. In particular, whenever an incomplete checklist exists, the NORMAL button 48 is displayed with an amber background. When there is no incomplete normal checklist, the background of NORMAL button 48 is white. This same color convention is used relative to display of the checklist title on the hereinafter described system menu screen.

MENU button 50 can be used at any time to select the checklist menu. As shall be described relative to FIG. 4, the menu display for the currently preferred embodiment of the invention provides access to each checklist provided by the system (both normal and non-normal). In addition, the system menu allows the crew member operating the system to selectively reset all normal checklists or, alternatively those normal checklists that would be reexecuted during a go-around procedure.

NOTES button 52 is shown in dotted lines in FIG. 2 to indicate that it is not displayed at all times. In particular, activation of NOTES button 52 with cursor 46 causes electronic checklist system 10 to display all operational notes that have been included in the checklists that have been executed during that particular flight. Thus, until a checklist is accessed that includes one or more operational notes, there are no operational notes for display. Whenever notes are not available, NOTES button 52 is not displayed. As soon as operational notes are encountered, electronic checklist system 10 establishes an operational notes file and causes NOTES button 52 to be displayed on all system checklist screens and on the system menu screen.

N-NORMAL button 53 also is shown in dotted lines in FIG. 2 to indicate that it only is displayed when crew alert messages are being supplied by crew alert system 12. The purpose of N-NORMAL button 53 is to provide rapid access and display of non-normal checklists that are associated with crew alert messages. As shall be described in more detail relative to FIG. 3, whenever crew alert system 12 is supplying one or more crew alert messages, the crew member operating electronic checklist system 10 can activate N-NORMAL button 53 to select corresponding checklists. When more than one crew alert message exists, the corresponding checklists are accessed and displayed in accordance with the priority of the message, with repeated actuation of N-NORMAL button 53 causing sequential display of the available checklists. If N-NORMAL button 53 is repeatedly actuated to display all available checklists, an additional actuation causes electronic checklist system 10 to display a menu listing all crew alert messages. The menu can then be used to select the desired checklist activity.

Shown in the upper right-hand region of FIG. 2 a legend "CHECKLIST COMPLETE." As is indicated by the dotted lines, the legend is not displayed until all checklist line items of the displayed checklist are complete. In accordance with the color convention used in the currently preferred embodiments of the invention, when the checklist items of both pages 1 and 2 of the Before Start Checklist all have been completed, the legend "CHECKLIST COMPLETE" will be displayed in green on both pages of the checklist.

FIGS. 3A and 3B illustrate operation of electronic checklist system 10 during periods of time in which crew alert system 12 is providing one or more crew alert messages. More specifically, FIG. 3A depicts the reporting of three crew alert messages, which are displayed in the upper right-hand portion of crew alert system display unit 30. This method of displaying crew alert messages is used in the previously mentioned Engine Indicating and Crew Alert System of the Boeing B757, B767, and B747-400. In this arrangement, the crew alert messages are displayed in a manner that indicates message priority (potential importance of the reported condition). In this regard, the highest priority crew alert message is a "warning," which is displayed in red. CABIN ALTITUDE message 56 of FIG. 3A is an example of a warning message. In the arrangement being described, crew alert system "caution" and "advisory" messages are both displayed in amber. To distinguish between caution messages and advisory messages, the advisory messages are indented relative to display of both warning and caution messages. In FIG. 3A, BLD DUCT LEAK L is a crew alert caution message and BLEED LOSS L is an advisory crew alert message.

In the practice of the invention, display of the crew alert messages is supplemented to provide an indication of the status of the checklist that is associated with each crew alert message. In the currently preferred embodiments of the invention status information for the checklist associated with a crew alert message is provided by a checklist status block

62 that is displayed at the beginning of each crew alert message display. Status information is provided in a manner that corresponds to the previously described status indication used for normal checklists and the checklist line items of normal checklists. That is, if the non-normal checklist associated with a displayed crew alert message has not been accessed for execution, the associated status indicator 62 is white. If the non-normal checklist associated with a displayed crew alert message has been accessed but is not yet complete, the status indicator 62 that is associated with that crew alert message is amber. On the other hand, if the non-normal checklist associated with a crew alert message is complete, the checklist status indicator 62 associated with that crew alert message is displayed in green.

FIG. 3B illustrates an exemplary non-normal checklist that corresponds to cabin altitude message 56 of FIG. 3A. In viewing FIG. 3B, it will be noted that the format of the depicted non-normal checklist is substantially identical to the format of the normal checklist (e.g., the Before Start Checklist of FIG. 2). In particular, the checklist title (CABIN ALTITUDE) appears in title block 34 (located in the upper left-hand portion of the display presented by multifunction display unit 28); the command buttons (NORMAL button 48, MENU button 50, NOTE button 52 and N-NORMAL button 53) appear along the lower edge of the display; and paging indicator 40 is displayed to indicate the number of pages included in the checklist. In addition, the checklist line items of a non-normal checklist (e.g., Cabin Altitude Checklist of FIG. 3B) are displayed in the same manner as the checklist line items of a normal checklist. In this regard, the Cabin Altitude Checklist of FIG. 3B includes a closed-loop checklist line item 64-1 and two open-loop line items 64-2 and 64-3. As was described relative to the normal checklist of FIG. 2, closed-loop line item 64-1 will be complete once the electronic checklist system 10 has received a signal indicating that the desired condition exists. In the Cabin Altitude Checklist of FIG. 3B, line item 64-1 of the depicted Cabin Altitude Checklist will be complete as soon as the cabin altitude isolation valve switches have both been placed in the off position and that condition is confirmed by means of data signals applied to electronic checklist system 10 via airplane data buses 16.

As also was described relative to the normal checklist of FIG. 2, closed-loop checklist line items such as line item 64-1 of FIG. 3B may be complete at the time the crew member accessed the list or may require the crew member to activate a control or switch to achieve the condition required for the checklist line item to be complete. Once complete, the closed-loop line item is displayed in a manner that indicates complete status. (i.e., in the currently preferred embodiments of the invention the line item is displayed in green.)

Line item 64-2 of FIG. 3B is an open-loop checklist line item (indicated by square symbol 38) that in effect commands the crew member to check the airplane cabin altitude and its rate of change. This open-loop line item is completed in the same manner as the open-loop line items described relative to the normal checklist of FIG. 2. That is, the crew member uses the pointing device of checklist interface unit 32, positions the display cursor (46 in FIG. 2) over any portion of the line item and activates the switch associated with the pointing device. Upon completion, line item 64-2 is displayed in green to indicate the complete status.

Appearing after line item 64-2 in FIG. 3B is a "condition" line item 66. As previously noted, condition checklist line items are used in situations in which a particular act is to be performed or one or more checklist items are to be executed "if" a specified condition exists. Following each condition line item is a collection of one or more conditional line items that are to be executed if the condition line item is true. In this regard, the condition stated at condition checklist line item 66 of FIG. 3B is the inability to control the cabin altitude and the conditional line items are the passenger oxygen system being on (line item 68) and, in addition, the execution of a descent (line item 64-3).

Thus, with specific reference to line item 66, if the cabin altitude can be controlled the condition statement (cabin altitude cannot be controlled) is not true. To indicate the statement is not true, the crew member uses checklist interface unit 32 (FIG. 1) to position the cursor 46 (FIG. 2) over a portion of conditional line item 66 and activates the switch associated with the cursor. At that point, checklist line item 66 and the associated conditional items 68 and 64-3 are displayed in a manner that indicates that the conditional items 68 and 64-3 need not be completed (i.e., are skipped). In the currently preferred embodiments this indication is provided by displaying both the condition line item (e.g., line item 66 in FIG. 3B) and all conditional line items (e.g., line items 68 and 64-3) are displayed in low intensity gray. Further, the display of text 70, which follows line item 64-3 in FIG. 3B, is also changed to low intensity gray since text 70 is useful only if the descent called for by line item 64-3 is executed.

Whenever a condition line item is true, the conditional line items need to be executed. For example, with respect to FIG. 3B, if cabin pressure cannot be controlled line item 66 is true and conditional line item 68 should be executed. Since line item 68 is an open-loop line item, it will be executed by turning on the Passenger Oxygen System. Next, the pilot executes the descent called for by open-loop line item 64-3. As described relative to earlier discussed open-loop line items, completion is noted by using the cursor (46 in FIG. 2) and the checklist system interface unit (32 in FIG. 1). Once all conditional items (e.g., line items 68 and 64-3 of FIG. 3B) are complete, the condition statement (e.g., line item 66); the conditional statements (line items 68 and 64-3); and the text 70 associated with line item 64-3 are displayed in green. Preferably, each conditional checklist item is indicated by an easily identified symbol or other indicia. For example, in the arrangement of FIG. 3B, a "?" is displayed immediately to the left of conditional checklist item 66.

As is known to those familiar with airplane checklist procedures, printed checklists often include operational notes which provide information that is useful to the flight crew at that particular point of the checklist procedure. In the practice of the invention, applicable operational notes are displayed as integral parts of non-normal checklists, preferably being displayed in a manner that distinguishes operational notes from other display items such as the checklist line items. In the currently preferred embodiments of the invention, distinction is achieved by displaying the operational notes in blue. Moreover, in the currently preferred embodiments, each time crew alert system 12 supplies a crew alert message, the operational notes included in the non-normal checklist for that message are stored in a file (stored in system memory). Thus, operational notes are dynamically accumulated and can be rapidly made available. In this regard, and as previously mentioned, NOTES button 52 is displayed only when operational notes have been encountered and, in addition, actuation of NOTES button 53 results in the display of all operational notes appropriate to crew alert messages that have been reported by crew alert system 12.

As also was previously noted, N-NORMAL button 53 is displayed whenever crew alert messages are being supplied by crew alert system 12 of FIG. 1. Thus, N-NORMAL button 53 of FIG. 3B was initially displayed when electronic checklist system 10 first received one of the crew alert messages 56, 58 and 60. Once a crew alert message (e.g., crew alert messages 56, 58 or 60 of FIG. 3A) is displayed by crew alert system display unit 30 of FIG. 1 (and electronic checklist system 10 receives the corresponding crew alert message), the checklist system operator can actuate N-NORMAL button 53 in the previously described manner to access non-normal checklists that correspond to the reported crew alert messages. In this regard, if more than one crew alert message is present when a crew member actuates N-NORMAL button 53, the checklists are accessed and displayed in accordance with the priority of the crew alert messages. That is, if a crew alert warning message is displayed, the corresponding checklist will be accessed regardless of the number of crew alert caution and advisory messages that may also be present. Similarly, if crew alert caution and advisory messages are present and no crew alert warning message exists, actuation of N-NORMAL button 53 will cause electronic checklist system 10 to access and display the checklist that corresponds to the crew alert caution message. When two or more crew alert messages of the same priority are present, actuation of N-NORMAL button 53 causes electronic checklist system 10 to access the corresponding checklists in a sequence that corresponds to the sequence in which the crew alert messages were provided to electronic checklist system 10. With respect to the previously discussed Engine Indicating and Crew Alert System, which is incorporated in the currently preferred embodiments of the invention, this sequence corresponds to the sequence in which crew alert messages of identical priority are displayed on crew alert system display unit 30 of FIG. 1.

Since N-NORMAL button 53 is displayed whenever crew alert messages are present, it can be noted that N-NORMAL button 53 will remain displayed after completion of the Cabin Altitude Checklist indicated in FIG. 3B. In this regard, when the Cabin Altitude Checklist is complete, the Checklist Complete Legend (54 in FIG. 2; not shown in FIG. 3B) will be displayed and the status indicator 62 associated with Cabin Altitude crew alert message 56 that is displayed by crew alert system display unit 30 will be changed from amber to green to indicate the transition from incomplete to complete status. At that point, several options are available to the crew member operating electronic checklist system 10. If desired, the checklist for the BLD DUCT LEAK L crew alert caution message can be access and displayed by actuating N-NORMAL button 53. If desired, the non-normal checklist associated with the BLEED LOSS L advisory crew alert message can be accessed and displayed by a second actuation of N-NORMAL button 53. If, instead, NORMAL button 48 is actuated, electronic checklist system 10 will display the first unaccessed incomplete checklist in the sequence of normal checklists. Thus, if execution of a normal checklist such as the Before Start Checklist of FIG. 2 was interrupted to access and execute a non-normal checklist, such as Cabin Altitude Checklist of FIG. 3B, the system operator need only actuate NORMAL button 48 in order to return to the first unfinished line item of the checklist that was interrupted. As previously noted, whenever execution of a normal checklist is interrupted (by actuating MENU button 50, NOTES button 52 or N-NORMAL button 53), NORMAL button 48 will be displayed on an amber background or an alternative indication will be provided to indicate the incomplete status of a normal checklist.

MENU button 50 and NOTES button 52 provide options when the Cabin Altitude Checklist of FIG. 3B is complete and at all other times at which both buttons are displayed. In this regard, as was previously mentioned, NOTES button 52 is displayed whenever checklists have been accessed that include operational notes. Actuating NOTES button 52 upon completion of the Cabin Altitude Checklist of FIG. 3B (or at any other time it is displayed) will cause electronic checklist system 10 of FIG. 1 to display, for crew member review, all operational notes that have been encountered. On the other hand, actuation of MENU button 50 upon completion of the indicated Cabin Altitude Checklist (or at any other time) will cause electronic checklist system 10 to display a menu screen that allows access and display of any desired normal or non-normal checklist and, in addition, facilitates operations such as resetting electronic checklist system 10 at the completion of a flight or partially resetting electronic checklist system 10 for execution of a go-around maneuver.

Shown in FIG. 4 is the menu screen of the currently preferred embodiments of the invention. Listed below a Normal Checklist legend 72 in the arrangement of FIG. 4 is a list 74 of the normal checklists that is included in the currently preferred embodiments of the invention. These checklists, which are arranged in an order that corresponds to the normal operational sequence of the airplane are as follows: Before Start; After Start; Before Take Off; After Take Off; Approach; Landing; and, Shutdown. Preferably, the checklist titles are displayed in a manner that indicates the status of the corresponding checklist. In this regard, the currently preferred embodiments of the invention utilize the display color convention described relative to other display items such as checklist line items and checklist status indicators 62 of FIG. 3A. Specifically, the titles of checklists that have not been accessed and presented for execution are displayed in white; titles of any checklist that has been accessed for execution, but has not been completed is displayed in amber; and the rifles of each checklist that has been completed is displayed in green. As will be recognized by those skilled in the art, symbols or other indicia can be utilized to convey checklist status information.

The list 74 of normal checklists allows the pilot or other crew member to select a normal checklist out of sequence. Specifically, any of the listed normal checklists can be accessed and displayed by positioning the system cursor (46 in FIG. 2; not shown in FIG. 4) over a portion of the checklist title and actuating the switch associated with the cursor control. This capability provides a "look-ahead" feature that allows previewing a normal checklist prior to the time at which it would otherwise be accessed for execution.

Displayed immediately below list 74 of the normal checklists are the legends: "Go Around" and "Reset." When actuated at the conclusion of a flight (or at any other appropriate time), the Reset legend resets the status of all normal checklists to "not accessed." When this occurs, the status of all checklist line items (both open-loop and closed-loop) are set to "not complete." As a result, each normal checklist title displayed in the menu of FIG. 4 will be displayed in white; the open-loop checklist line items of a subsequently displayed checklist will be displayed in white; and any incomplete closed-loop checklist line items of the accessed checklist also will be displayed in white.

Actuating the Go Around Legend of the menu shown in

FIG. 4 resets the normal checklists to accommodate a go-around procedure. Specifically, if a go-around procedure is initiated during execution of the airplane approach or landing maneuver, the pilot or other crew member can actuate the go-around legend with the system cursor to reset the After Take Off Checklist and each subsequent checklist of list 74 in FIG. 4. The checks are thus made available for display and execution during go-around and in preparation for the ensuing approach and landing procedures.

Located immediately below the portion of the menu that displays the normal checklists is a checklist configuration block 76. Checklist configuration block 76 is used for display of information pertaining to checklist system 10 and/or the airplane in which the checklist system is installed. For example, checklist configuration block 76 can display a version number or last revision date for electronic checklist system 10. In addition, the airplane in which the system is installed can be identified by, for example, the airplane tail number.

Located below checklist configuration in block 76 and extending across the depicted menu screen is an EXIT button 78, which can be activated with the system cursor to terminate display of the menu screen and return display of the command buttons.

Located below a Non-Normal Checklist legend 80 in FIG. 4 is an UNANNUNCIATED CHECKLISTS legend 82 and an alphabetically arranged listing 84 of various airplane equipment and systems. UNANNUNCIATED CHECKLISTS legend 82 refers to a collection of conventionally arranged checklists that apply to non-normal conditions for which corresponding crew alert messages do not exist. When actuated with the system cursor, UNANNUNCIATED CHECKLISTS legend 82 causes display of the submenu that lists all available non-normal checklists for which there is no corresponding crew alert message. In this regard, and as is shown in FIG. 5, the Unannunciated Checklists Submenu of the currently preferred embodiments of the invention is displayed as a "pop-up" menu 86, which overlays the non-normal checklist region of the system menu.

As is indicated in FIG. 5, a listed unannunciated checklist is selected by appropriately positioning system cursor 46 (and actuating the associated cursor control switch). This allows a crew member to rapidly access and execute non-normal checklists that cannot be accessed in the manner described relative to FIG. 3. For example, FIG. 5 indicates selection and accessing of a Ditching Preparation Checklist, a procedure for which no crew alert message is provided by the previously mentioned Engine Indicating and Crew Alert System.

With continued reference to FIG. 5, it can be noted that the depicted Unannunciated Checklists Submenu 86 includes an EXIT button 88. Actuation of EXIT button 88 causes display of the previous screen (i.e., the menu of FIG. 4). Thus, when Unannunciated Checklists Submenu 86 has been selected and displayed, a crew member may either select one of the unannunciated checklists for display or, in the alternative, return to the system primary menu.

Listing 84 of airplane equipment and system allows access of all non-normal checklists contained on checklist system data 18 of FIG. 1, including checklists for which crew alert system 12 of FIG. 1 (e.g., the previously referenced Engine Indicating and Crew Alert System) supplies crew alert messages. In this regard, when a particular item of airplane equipment or a particular airplane system is selected from listing 84 by means of the previously described system cursor arrangement, a submenu is displayed in the same manner as was described relative to Unannunciated Checklists Submenu 86 of FIG. 5. Listed on each submenu are the non-normal checklists that relate to the selected airplane equipment or system. For example, selection of the ELECTRICAL system listing (86 in FIG. 4) would result in display of a submenu listing checklists such as: an Electrical AC Bus Checklist; an Electrical Bus Isolation Checklist; an Electrical Drive Checklist; an Electrical Utility Bus Checklist, etc. As was described with respect to Unannunciated Checklists Submenu 86 of FIG. 5, each submenu for the airplane equipment and systems included in list 84 preferably provides an EXIT Button that enables the system operator to return to the primary system menu of FIG. 4. Preferably, the airplane equipment and system list 84 and the associated submenus provide a "browsing" feature that can be used for previewing non-normal checklists.

The above described features of the invention, as well as other related features and advantages, are achieved by signal processing in which signals are processed and the related checklist information is displayed on the basis of certain checklist attributes and certain checklist line item attributes. More specifically, in the currently preferred embodiments of the invention, the following seven attributes are associated with each checklist and are used to control checklist display as well as related indicia such as status indicator 62 of FIG. 3A:

1. Checklist Title. A string of alphanumeric characters that identifies the associated checklist.
2. Checklist Type. A digitally encoded signal indicating whether the associated checklist is a normal checklist, a non-normal checklist, or an unannunciated checklist.
3. Checklist Priority. A digitally encoded signal representative of whether a non-normal checklist of the type that is associated with a crew alert system message is a crew alert warning; a crew alert caution; or, a crew alert advisory.
4. Checklist Status. A digitally encoded signal representative of whether the related checklist has not been accessed ("not accessed"); has been accessed and displayed, but has not been fully completed ("incomplete"); or, has been accessed, displayed and fully completed "complete").
5. Number of Items. An integer designating the number of items (open-loop checklist line items, closed-loop checklist line items and operational notes) that are included in the related checklist.
6. Last Accessed Page of Checklist. An integer greater than or equal to zero and less than or equal to the number of pages in the checklist. If the associated checklist has been accessed (checklist status incomplete or complete), this attribute indicates the current page of a displayed checklist or the page of an interrupted checklist that includes the first incomplete checklist line item.
7. Number of Pages. A non-zero, positive integer that indicates the number of pages included in the associated checklist.

The checklist item attributes utilized in the currently preferred embodiments of the invention are as follows:

1. Item Type. A digitally encoded signal that identifies the associated checklist item with respect to whether it is a closed-loop checklist item; an open-loop checklist item; an operational note; a checklist subtitle; or a conditional checklist line item.

2. Checklist Item Identity. A numeral or other identification that allows rapid retrieval of the checklist item from memory. The identity attribute is not unique in that the related checklist item may be included in more than one checklist.

3. Note Identifier. A digitally encoded signal that indicates whether the associated checklist item is a note; is not a note; or is a conditional note (i.e., a note that is not displayed when NOTES button 52 is actuated, unless the condition has been met).

4. A Landing Preparation Indicator. A digitally encoded signal that indicates whether the associated checklist item is to be displayed as a portion of the System Approach Checklist.

5. A "Note To Stay" Indication. A digital signal indicating whether actuation of NOTES button 52 of FIGS. 2 and 3B will cause the operational notes included in the associated checklist will be displayed after the corresponding crew alert message is no longer being supplied by crew alert system 12 of FIG. 1 (i.e., whether the notes are effective after the crew alert has ended.

6. A "Landing Preparation To Stay" Indicator. A digital signal indicating whether landing preparation steps included in the associated checklist are to be: displayed as a part of the normal Approach Checklist in the event that the crew alert message associated with the landing preparation step no longer is being supplied by crew alert system 12 (i.e., is no longer displayed by crew alert system display unit 30.

7. A "Complete-Before" Identifier. A set of checklist identity attributes identifying an antecedent sequence of checklist items that are to be considered complete when the checklist item associated with the Complete Before identifier is executed (completed).

8. A "Skip-After" Indicator. A set of checklist item identity attributes identifying a subsequent sequence of checklist items that is to be skipped if the checklist item associated with the skip-after identifier is executed (i.e., is completed).

9. A "Skip-Before" Identifier. A set of checklist item identity attributes that identify a sequence of checklist items that is immediately antecedent to the checklist item associated with the skip-before identifier and is skipped when the associated checklist item is executed.

10. Number of Lines. A non-zero positive integer that designates the number of lines of text that is included in the display of the associated checklist item.

11. Switch Identifier. The identification of the switch (or other discrete signal) whose operational state determines the status of the checklist item associated with the switch indicator.

12. Timer Indicator. An encoded "yes"/"no" indication as to whether a digital timer is to be displayed in conjunction with the checklist line item that is associated with the timer indicator.

13. Timer Duration. The duration (in seconds) of a timer for a checklist item having a timer indicator attribute that designates use of a timer.

14. Message Identification. The identification of the crew alert system message that is associated with that particular checklist item.

15. Checklist Item Status. A digitally encoded signal that indicates whether an associated closed-loop or open-loop checklist line item is complete or not complete.

Figure 6:
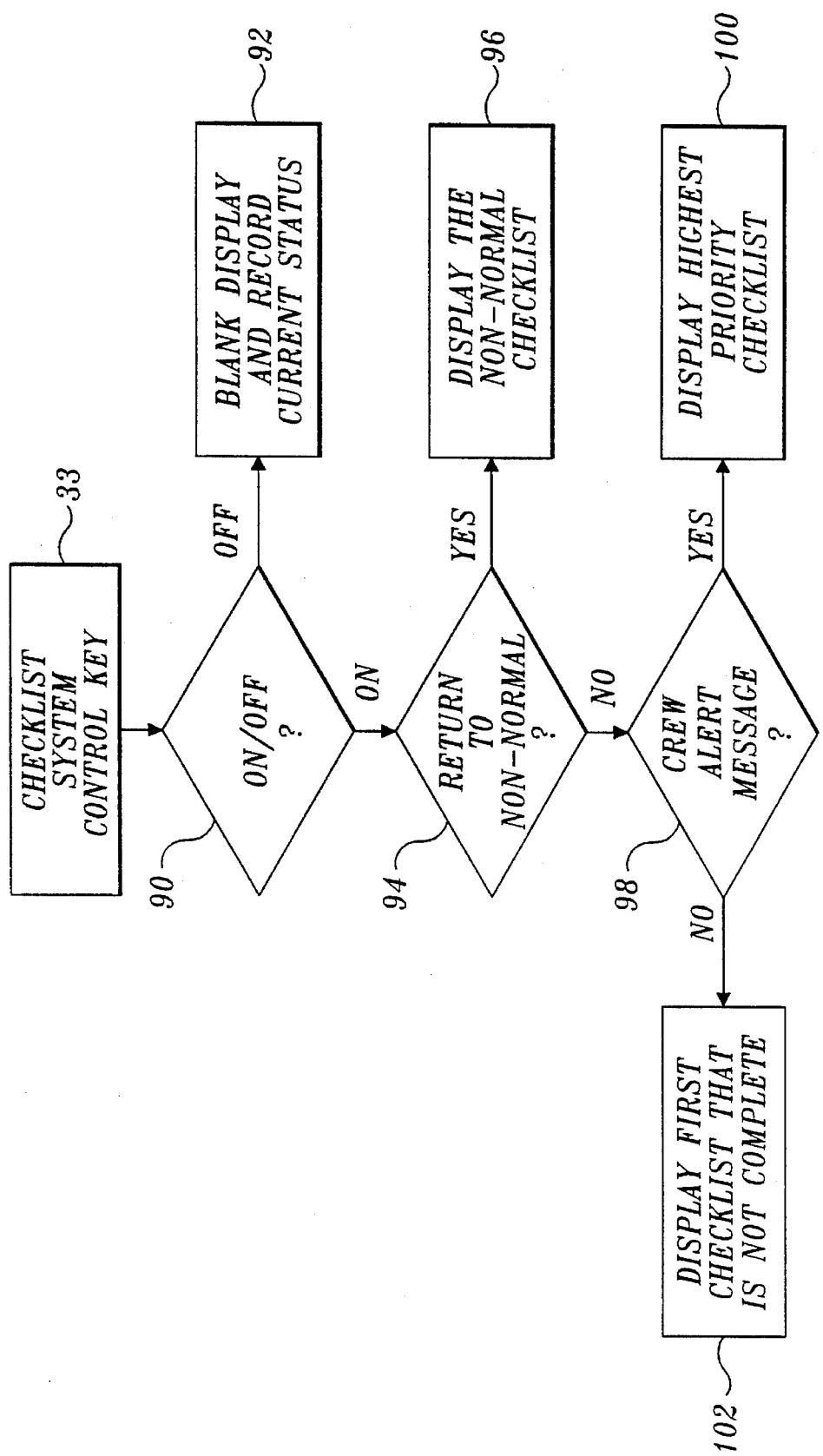
FIG. 6 is a flow diagram which illustrates operation of the disclosed embodiment of the invention in response to activation of a checklist system control key.

Reference is now taken to FIG. 6, which illustrates the use of checklist system control key 33 of FIG. 1 and the above-defined checklist and checklist line item attributes in controlling the display of normal and non-normal checklists. In the currently preferred embodiments of the invention, checklist system control key 33 functions as an on-off switch. When electronic checklist system 10 is initially energized (checklist system control key initially turned on), the arrangement of FIG. 6 determines the identity of the checklist displayed on multi-function display unit 28 of FIG. 1. Switching checklist system control key from the on to off position interrupts checklist display by multi-function display unit 28, thus allowing the display unit to be used for other purposes (i.e., to be used as a multi-function display unit). When checklist system control key 33 is returned to the on position, the arrangement of FIG. 6 returns the checklist display to the condition that existed at the time checklist system control key was turned off.

To accomplish the above-described functions, a determination is made at decisional block 90 as to whether checklist system control key 33 is being turned on or off as is indicated at block 92, if checklist system control key 33 is being turned off after being on, the system display (multi-function display unit 28 in FIG. 1) is blanked and a record is made (in system memory) of the current checklist display status. This record includes the above-defined checklist attributes and checklist item attributes that are required for subsequently reinstating the checklist display. As previously mentioned, when the checklist is no longer displayed (after blanking), the system display (multi-function display unit 28) is available for use in displaying information from systems other than electronic checklist system 10.

If it is determined at decisional block 90 that checklist system control key 33 is being switched to the on position, a determination is made at decisional block 94 as to whether the system display should be returned to a previously displayed non-normal checklist. If checklist system control key 33 is being returned to the on position, the status information required to restore a previous display is available in system memory (having been previously recorded at block 92 of FIG. 6. If the recorded status information indicates that the previously displayed checklist was a non-normal checklist, the identity of the checklist and other recorded attributes are used to reinitiate the display of the non-normal checklist as it existed when the checklist system control key 33 was switched to the off position (indicated at block 96 in FIG. 6).

If it is determined at decisional block 94 that there is no previously displayed non-normal checklist, checklist system control key 33 is being turned on for the first time; is being returned to the on state after interrupting the display of a normal checklist; or is being returned to the on state after previously completing a checklist. Under this situation, a determination is made as to whether crew alert system 12 is supplying one or more crew alert messages (indicated at decisional block 98 in FIG. 6). If one or more crew alert messages are being supplied to electronic checklist system 10, the non-normal checklist associated with the highest priority crew alert message will be displayed (indicated at block 100 in FIG. 6). In this regard, the previously described checklist priority attribute is employed to determine the existing crew alert message that has the highest priority. In the currently preferred embodiments of the invention, checklist selection between crew alert messages of equal priority is made on the basis of the order in which the crew alert messages are displayed on crew alert system display unit 30 (i.e., the sequence in which crew alert system 12 generated the equal priority crew alert messages).

If no crew alert messages exist (determined at decisional block 98), the arrangement of FIG. 6 causes display of the first normal checklist that is not complete. That is, electronic checklist system 10 causes display of the first normal checklist (in the sequence of normal checklists) that has a status attribute indicating "not accessed" or "incomplete." If a status attribute indicates the existence of an incomplete normal checklist electronic checklist system 10 causes that checklist to be displayed. In such case, the status record recorded at block 92 in FIG. 6 when the previous display of the checklist was interrupted is used to return the checklist display to its previous condition. On the other hand, if one or more normal unaccessed checklists are available, but there is no incomplete normal checklist, the first unaccessed checklist of the sequence of checklists will be displayed. This condition occurs when the checklist system control key is initially switched to the on position, causing display of the first checklist of the normal checklist sequence being employed (e.g., Before Start Checklist of FIG. 2) and also occurs if checklist system control key 33 is being returned to the on position after a previous on period in which all accessed normal and non-normal checklists were completed.

Although not indicated in FIG. 6, certain background processing is implemented by electronic checklist system 10 each time crew alert system 12 supplies a crew alert message. In particular, the identity of the crew alert message is used to determine the corresponding non-normal checklist and operational notes and landing preparation instructions for that non-normal checklist are determined based upon the previously mentioned landing preparation attribute and note identification attribute. The operational notes and the landing preparation notes are respectively stored in an operational notes file and a landing preparation file. As previously mentioned, operational notes during operation of the system are stored in this manner for display and review by the pilot or a crew member whenever NOTES button 52 of FIGS. 2 and 3B is actuated. In a similar manner, landing preparation notes encountered during operation of the system are stored for display as a portion of the Approach Checklist and, thus, are available for the flight crew's consideration and action.

Background processing continues during the operation of electronic checklist system 10 to detect removal of crew alert messages. If a crew alert message is removed, the previously mentioned Note To Stay attribute and Landing Preparation To Stay attribute are used to determine whether operational notes and landing preparation steps are to be removed from the notes file and landing preparation file. If removed, the operational notes are not displayed when NOTES button 52 is actuated and the landing preparation steps are not displayed as a portion of the System Approach Checklist.

Figure 7:
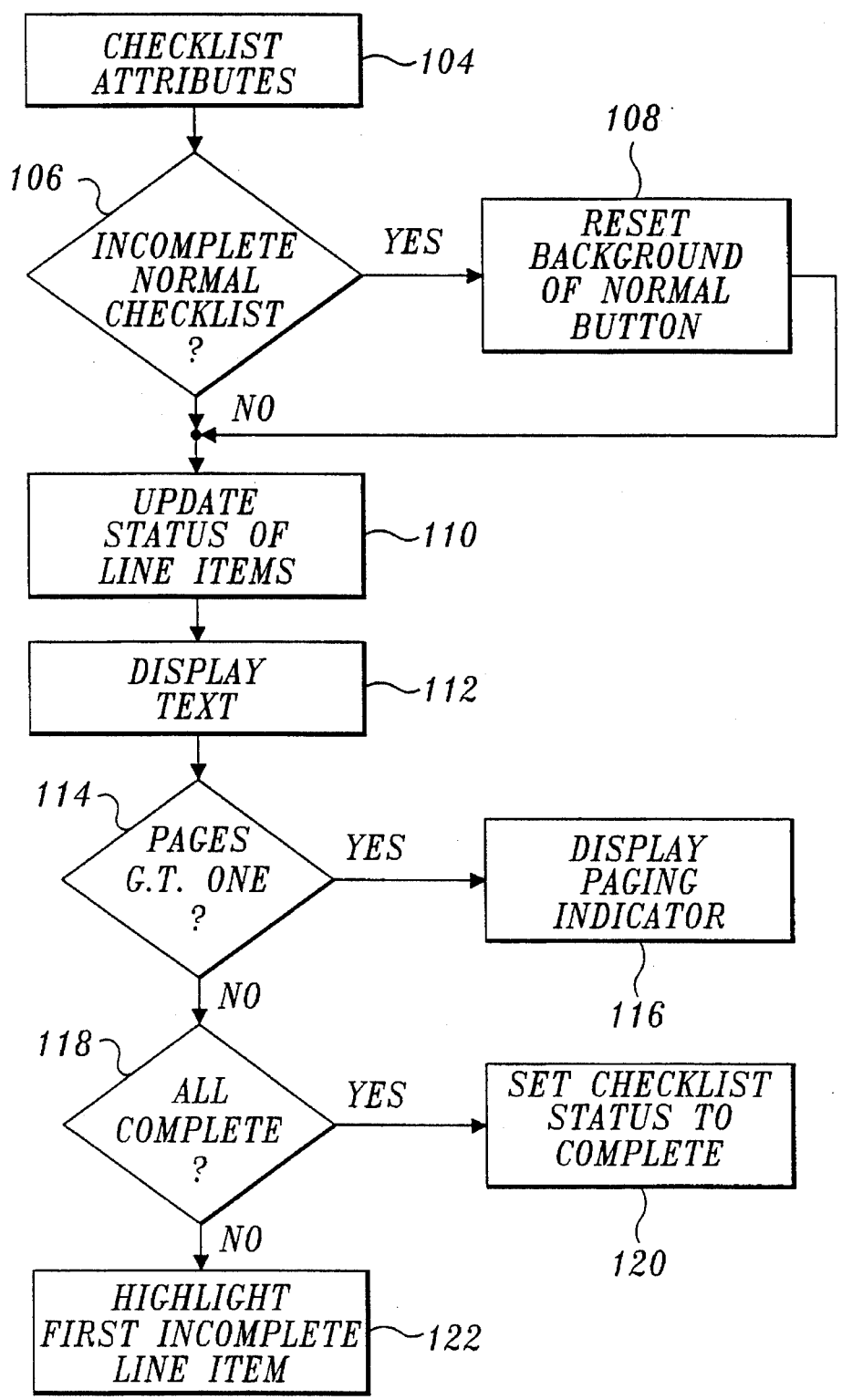
FIG. 7 is a flow diagram illustrating the process by which the disclosed embodiments of the invention establishes a checklist display.

FIG. 7 illustrates the process by which the electronic checklist system 10 establishes a checklist display (e.g., displays a normal or non-normal checklist in the manner indicated at blocks 96, 100 and 102 in FIG. 6). In the process of FIG. 7, the checklist attributes of the checklist to be displayed (indicated at block 104) are accessed and a determination is made as to whether the checklist to be displayed is an incomplete normal checklist (indicated at decisional block 106). As is indicated at block 108, if an incomplete normal checklist is to be displayed, the amber background of NORMAL button 48 is removed so that NORMAL button 48 no longer indicates an existence of an undisplayed incomplete normal checklist. Following any necessary resetting of the background color of NORMAL button 48, the status of each checklist line item is updated (indicated at block 110 in FIG. 7). Specifically, the switch attribute of each closed-loop checklist line item is updated to reflect the status of the associated switch on overhead switch panel 20 in FIG. 1 (or the status of other discrete signal). This switch status information determines the line item status (complete or not complete) of related closed-loop checklist line items. Next, as is indicated at block 112, the checklist text is displayed. As previously described, in the currently preferred embodiments of the invention, text is displayed in white if it is an incomplete line item; is displayed in green if it is a checklist line item that has been completed; and is displayed in cyan if it is an operational note or a title. Moreover, in the currently preferred embodiments of the invention, symbols such as symbols 38 of FIG. 2 are generated to indicate open-loop checklist items.

As is indicated at decisional block 114 of FIG. 7, if the checklist being displayed includes more than one page, paging indicator 40 is displayed. As was described relative to FIGS. 2 and 3B, paging indicator 40 of the currently preferred embodiments of the invention includes a vertical series of page numbers in which the page number is displayed in white if at least one item of the page is incomplete; is displayed in green if no item of the page is incomplete; and is displayed in cyan if every item on that page is either a title or an operational note. When paging indicator 40 is initially displayed, the page indicating arrow 42 is set at page 1. When all line items of page 1 have been completed, in the manner described relative to FIGS. 2 and 3B, the background color of the completed page is changed to green and the next page of the checklist is displayed (not shown in FIG. 7). As was previously described, the pilot or crew member operating the system can move from page-to-page by using the page indicators as electronic buttons that are actuated by checklist system interface unit 32 or an equivalent device.

As also was described relative to FIGS. 2 and 3B, checklist interface unit 32 of FIG. 1 is used by the pilot or another crew member to indicate completion of displayed open-loop checklist line items. As is indicated by decisional block 118 of FIG. 7, once all line items are complete, the checklist page and/or status attribute is updated. In addition, if a non-normal checklist is being completed, the checklist status indicator 62 associated with the corresponding displayed crew alert message is displayed in green to indicate the complete status. This updating of checklist status is indicated at block 120 in FIG. 7. As is indicated at block 122 in FIG. 7, whenever one or more line items of a displayed checklist are not complete, the first incomplete line item is highlighted.

As was described relative to FIGS. 2–5, the system command buttons (i.e., NORMAL button 48; MENU button 50; NOTES button 52; and N-NORMAL button 53) allow the pilot or other crew member to assert substantial control over the operation of electronic checklist system 10. In this regard, and as was previously described, NOTES button 52 is displayed whenever non-normal checklists that contain operational notes have been accessed. Specifically, operational notes that have been stored to a notes file in the previously described manner are displayed by multi-function display unit 28 whenever NOTES button 52 is actuated with checklist interface unit 32.

As also was described relative to FIGS. 2–5, actuation of the MENU button 50 by the pilot or crew member results in the display of a menu that lists both normal and non-normal checklists. Various submenus can be accessed from the menu to provide the capability of accessing, displaying and executing unannunciated checklists and, in addition, provide a browse feature that allows the pilot or other crew member to view non-normal checklists that are associated with crew alert messages. In the currently preferred embodiments of the invention, the sequence of normal checklists is displayed, with the color of the checklist title indicating checklist status (green for complete; white for unaccessed; and amber for a normal checklist that has been accessed, but is not complete). Also included with the listed sequence of normal checklists are Go Around and Reset legends, each of which can be actuated by the use of checklist interface unit 32. When the Go Around legend is actuated the After Take Off Checklist; Approach Checklist; Landing Checklist; and Shut Down Checklist are reset to provide checklist capability during a go-around procedure and subsequent landing. Actuation of the Reset legend resets all normal checklists.

Figure 8:
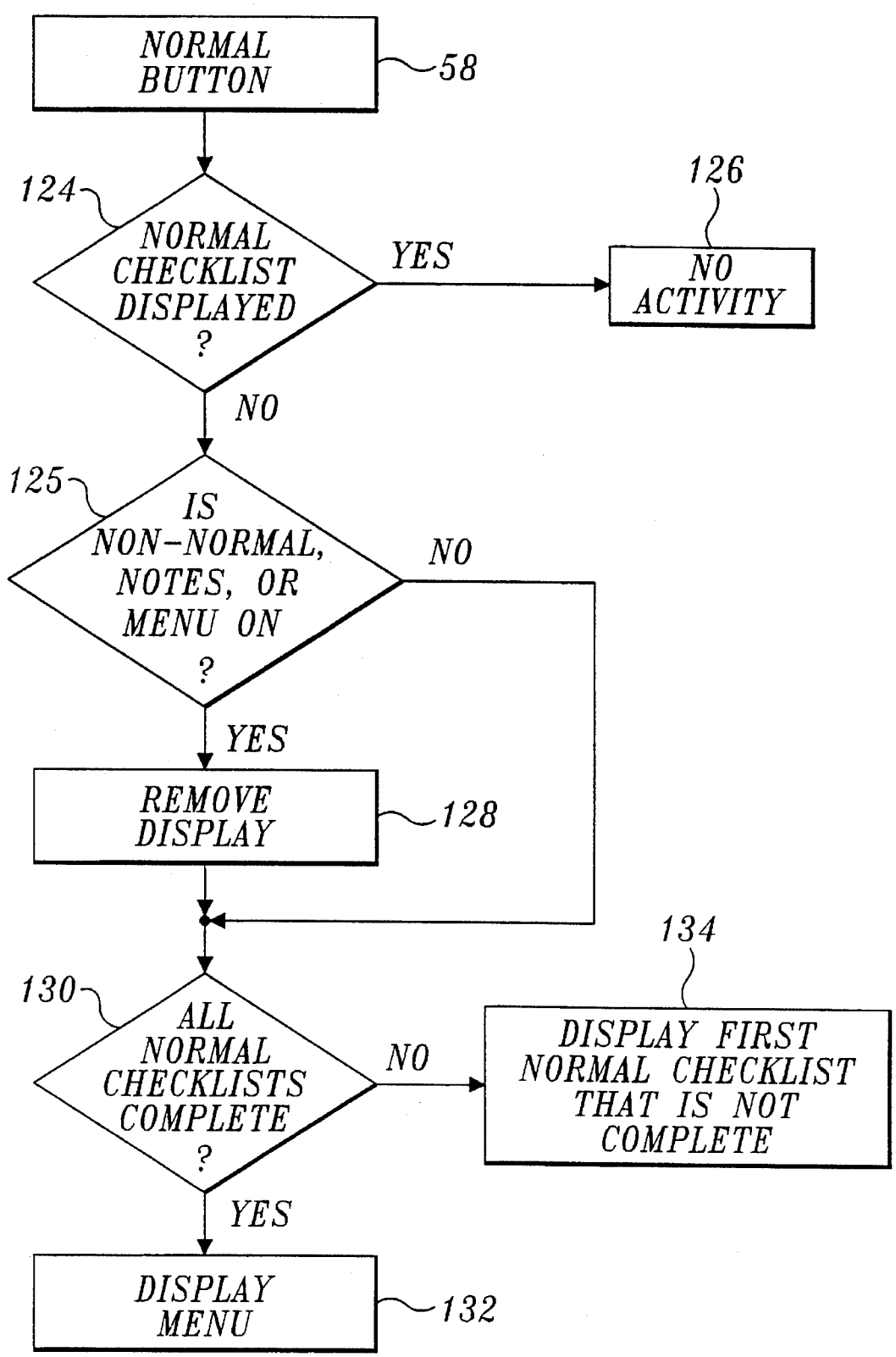
FIG. 8 is a flow diagram depicting operation of the invention in response to a normal command button which is actuated to control the display of normal checklists.

FIG. 8 illustrates operation of electronic checklist system 10 when NORMAL button 48 is actuated. As is collectively indicated by decisional block 124 and block 126, if NORMAL button 58 is actuated when a normal checklist is being displayed, there is no change in the system display status. On the other hand, if a non-normal checklist, a menu or a notes screen is being displayed when NORMAL button 58 is activated (determined at decisional block 125), the display is eliminated (indicated at block 128). A determination is then made at decisional block 130 as to whether all normal checklists are complete (i.e., no normal checklists are available for execution). If this is the case, electronic checklist system 10 automatically displays the system menu (indicated at block 132), to indicate the complete status of all normal checklists and, in addition, to allow selection of a non-normal checklist or other option.

As is indicated at block 134 of FIG. 8, if the sequence of normal checklists includes one or more checklists that have not been completed, electronic checklist system 10 displays the first checklist of the sequence that has a status indicator of unaccessed or incomplete. As was previously described, this method of accessing normal checklists ensures that the checklists are presented in accordance with the established sequence and, in addition, allows rapid retrieval and display of incomplete normal checklists by actuating a single control NORMAL button 48).

Figure 9:
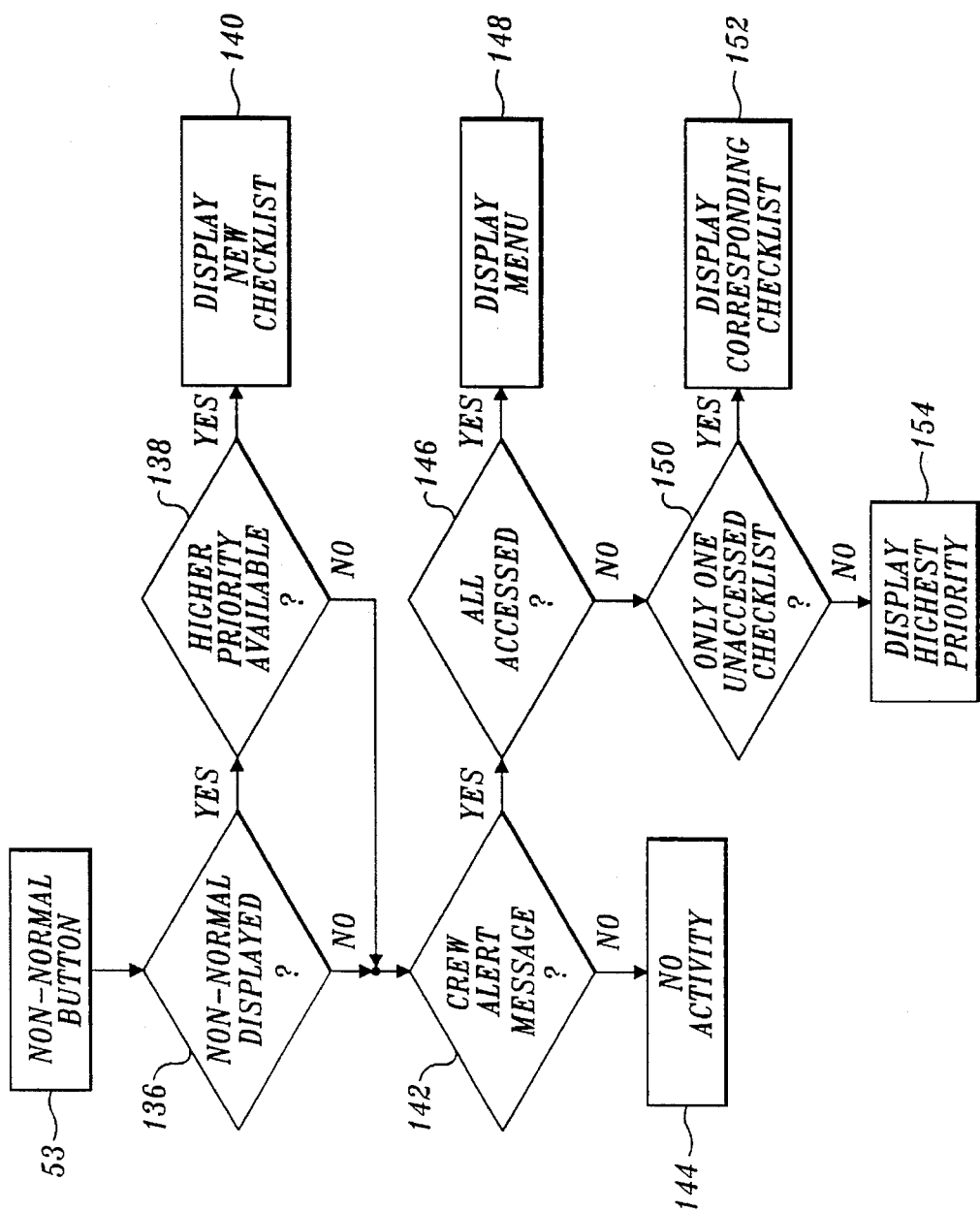
FIG. 9 is a flow diagram illustrating the operation of the electronic checklist system in response to actuation of a non-normal command button for controlling display of non-normal checklists.

FIG. 9 illustrates system operation when N-NORMAL button 53 is actuated. As is indicated by decisional block 136 of FIG. 9, if N-NORMAL button 53 is actuated when a non-normal checklist is being displayed, a determination is made (at decisional block 138) as to whether the priority of the crew alert message that corresponds to the displayed non-normal checklist is lower than the priority of another, currently displayed crew alert message. If a higher priority crew alert message is being supplied, the non-normal checklist corresponding to the higher priority crew alert message is displayed (indicated at block 140).

If it is determined at decisional block 138 that a higher priority crew alert message is not available or, in the alternative, it is determined that N-NORMAL button 53 is actuated when a non-normal checklist is not being displayed, a determination is made as to whether a crew alert message is being supplied by crew alert system 12 (indicated at decisional block 142). As is indicated at block 144, if a crew alert message is not being supplied, no changes are made in the system display. On the other hand, if at least one crew alert message is being supplied, a determination is made as to whether all non-normal checklists for use with the crew alert messages have been accessed and displayed (indicated at decisional block 146). As is indicated at block 148 of FIG. 9, if all applicable non-normal checklists have been accessed, a menu is displayed that lists the non-normal checklists. Displaying this menu allows the captain or another crew member to select one of the non-normal checklists with checklist interface unit 32 of FIG. 1 or, alternatively, exit the displayed menu and, if desired, actuate one of the system command buttons.

If it is determined at decisional block 146 that all of the non-normal menus associated with currently supplied crew alert messages have not been accessed, a determination is made as to whether a single unaccessed checklist exists (indicated at decisional block 150). As is indicated at block 152, if a single unaccessed non-normal checklist exists, that checklist is displayed. On the other hand, if more than one unaccessed non-normal checklist exists, the non-normal checklist that corresponds to the highest priority crew alert message will be displayed (indicated at block 154).

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-based method for accessing, and displaying normal and non-normal checklists that are associated with airplane flight operations, each of said normal checklists including a plurality of checklist line items that define a checklist procedure for use during routine operation of an airplane, each of said non-normal checklists including a plurality of checklist line items that define a checklist procedure for use following an indication of a condition not within the routine operation of said airplane, wherein said normal and non-normal checklists each include one or more open loop line items whose completion must be indicated manually and at least one closed loop line item whose completion is automatically detected by reading an aircraft data bus and wherein said non-normal checklists include one or more checklists associated with crew alert messages that are generated by an airplane crew alert system, said method comprising:

establishing a plurality of normal checklists, wherein each normal checklist is associated with a predetermined procedure to be executed by a pilot during the normal operational sequence of said airplane;

establishing a first plurality of non-normal checklists, wherein each non-normal checklist is associated with a predetermined procedure to be executed by the pilot during non-normal operation of the airplane, each checklist of said first plurality of non-normal checklists corresponding to a different one of said crew alert messages;

establishing an associated series of one or more attributes for each said normal checklist and for each said non-normal checklist, each said series of attributes including a checklist status indicator representative of whether the checklist associated with that particular series of attributes has not been accessed and displayed, has been accessed and displayed without being completed, or has been accessed, displayed, and completed;

accessing and displaying said open loop and closed loop line items of said normal and non-normal checklists on a display unit;

determining when the pilot has executed the normal and non-normal checklist by reading an aircraft data bus to determine when the pilot has executed a closed loop action item and reading a signal from the pilot that an open loop action item has been completed; and providing a visual indication to the pilot on the display unit confirming that the open loop and closed loop line items have been completed.

2. The computer-based method of claim 1, wherein at least one of said non-normal checklists of said first plurality of non-normal checklists includes one or more operational notes, each said operational note providing information for use with a corresponding checklist line item, and wherein said computer-based method further comprises the steps of:

monitoring said crew alert messages that are supplied by said crew alert system;

detecting whether said non-normal checklist associated with a monitored crew alert message includes operational notes;

upon detecting that said non-normal checklist includes operational notes, storing said operational notes in a memory;

receiving a signal indicating that the pilot wishes to view the notes stored in the memory; and displaying for review all said operational notes that are stored in said memory.

3. The computer-based method of claim 2, wherein each said series of attributes that is associated with a non-normal checklist includes a notes display attribute that indicates whether said operational notes are to be displayed, the method further comprising the steps of:

determining if the crew alert message associated with the non-normal checklist is no longer being supplied by said crew alert system; and upon determining that the crew alert message associated with the non-normal checklist is no longer being supplied by said crew alert system, removing from said memory each operational note associated with the checklist line items that are included in the non-normal checklist if said notes display attribute indicates that said operational notes are not to be displayed.

4. The computer-based method of claim 1, wherein at least one of said non-normal checklists of said first plurality of non-normal checklists includes one or more line items corresponding to one or more landing procedure steps and wherein said computer-based method further comprises the steps of:

monitoring said crew alert messages that are supplied by said crew alert system;

detecting whether said non-normal checklist associated with a monitored crew alert message includes one or more line items corresponding to one or more landing procedure steps;

upon detecting that said non-normal checklist includes one or more line items corresponding to one or more landing procedure steps, storing said line items in a memory; and displaying said one or more line items corresponding to one or more landing procedure steps as part of a normal checklist provided for use during the approach phase of a landing.

5. The computer-based method of claim 1, further comprising: providing a visual indication of the status of said normal and non-normal checklists, said visual indication being indicative of whether said normal and non-normal checklists have not yet been accessed and displayed, have been accessed and displayed without being completed, or have been accessed, displayed and completed.

6. The computer-based method of claim 1, further comprising a second plurality of non-normal checklists, each non-normal checklist of said second plurality of non-normal checklists including one or more line items that define a procedure for a non-normal condition that is not associated with a crew alert message supplied by said crew alert system, the method further comprises the step of:

establishing an associated series of one or more attributes for each non-normal checklist of said second plurality of non-normal checklists, each of said series of attributes including a checklist status indicator representative of whether the non-normal checklist associated with the status indicator has not been accessed and displayed, has been accessed and displayed without being completed, or has been accessed, displayed and completed.

7. The computer-based method of claim 6, further comprising: providing a visual indication of the status of said normal checklists and at least one non-normal checklists, said visual indication being indicative of whether said normal and non-normal checklist have not yet been accessed and displayed, have been accessed and displayed without being completed, or have been accessed, displayed and completed.

8. The computer-based method of claim 7, wherein at least one of said non-normal checklists of said first or second plurality of non-normal checklists includes one or more operational notes, each said operational note providing information for use with a corresponding checklist line item of the non-normal checklist and wherein said computer-based method further comprises the steps of:

monitoring said crew alert messages that are supplied by said crew alert system;

detecting whether said non-normal checklist associated with a monitored crew alert message includes operational notes;

upon detecting that said non-normal checklist includes operational notes, storing said operational notes in a memory; and displaying for review all said operational notes that are stored in said memory.

9. The computer-based method of claim 8, wherein each said series of attributes that is associated with a non-normal checklist includes a notes display attribute that indicates whether said operational notes are to be displayed, the method further comprising the steps of:

determining if the crew alert message associated with the non-normal checklist is no longer being supplied by said crew alert system; and upon determining that the crew alert message is no longer being supplied by said crew alert system, removing from said memory each operational note associated with the checklist line items that are included in the non-normal checklist if said notes display attribute indicates that said operational notes are not to be displayed.

10. The computer-based method of claim 1, wherein said step of accessing and displaying a normal checklists is performed by the actuation of a single selection device.

11. The computer-based method of claim 12, wherein at least one of said non-normal checklists of said first plurality of non-normal checklists includes one or more line items corresponding to one or more landing procedure steps and wherein said computer-based method further comprises the steps of:

monitoring said crew alert messages that are supplied by said crew alert system;

detecting whether said non-normal checklist associated with a monitored crew alert message includes one or more line items corresponding to one or more landing procedure steps;

upon detecting that said non-normal checklist includes one or more line items corresponding to one or more landing procedure steps, storing said one or more line items in a memory; and displaying said one or more line items corresponding to said one or more landing procedure steps as part of a normal checklist provided for use during the approach phase of a landing.

12. The computer-based method of claim 11, wherein at least one of said non-normal checklists of said first plurality of non-normal checklists includes one or more operational notes, each said operational note providing information for use with a corresponding checklist line item and wherein said computer-based method further comprises the steps of:

monitoring said crew alert messages that are supplied by said crew alert system;

detecting whether said non-normal checklist associated with a monitored crew alert message includes operational notes;

upon detecting that said non-normal checklist includes operational notes, storing said operational notes in a memory;

receiving a signal indicating the pilot wishes to view the notes stored in the memory; and displaying for review all said operational notes that are stored in said memory.

13. The computer-based method of claim 12, wherein each said series of attributes that is associated with a non-normal checklist includes a notes display attribute that indicates whether said operational notes are to be displayed, the method further comprising the steps of:

determining if crew alert message associated with the non-normal checklist is no longer being supplied by said crew alert system; and upon determining that the crew alert message associated with the non-normal checklist is no longer being supplied by said crew alert system removing from said memory each operational note associated with the non-normal checklist if said notes display attribute indicates that said operational notes are not to be displayed.

14. The computer-based method of claim 13, further comprising: providing a visual indication of the status of said normal and non-normal checklists, said visual indication being indicative of whether said normal and non-normal checklists have not yet been accessed and displayed, have been accessed and displayed without being completed, or have been accessed, displayed and completed.

\* \* \* \* \*